US009665279B2

(12) United States Patent  
Griffin et al.

(10) Patent No.: US 9,665,279 B2  
(45) Date of Patent: May 30, 2017

(54) ELECTRONIC DEVICE AND METHOD FOR PREVIEWING CONTENT ASSOCIATED WITH AN APPLICATION

(71) Applicant: BLACKBERRY LIMITED, Waterloo (CA)

(72) Inventors: Jason Tyler Griffin, Kitchener (CA); Dan Zacharias Gärdenfors, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 36 days.

(21) Appl. No.: 14/221,413

(22) Filed: Mar. 21, 2014

(65) Prior Publication Data

US 2015/0268855 A1 Sep. 24, 2015

(51) Int. Cl.

| G06F 3/0489 | (2013.01) |
|---|---|
| G06F 3/0484 | (2013.01) |
| G06F 3/0488 | (2013.01) |
| G06F 3/0485 | (2013.01) |

(52) U.S. Cl.  
CPC ........ *G06F 3/04897* (2013.01); *G06F 3/0485* (2013.01); *G06F 3/04883* (2013.01)

(58) Field of Classification Search  
CPC ....................................... G06F 3/048–3/04897  
See application file for complete search history.

(56) References Cited

U.S. PATENT DOCUMENTS

| 2001/0003097 A1* | 6/2001 | Jeoung ................ H04M 1/7258 455/566 |
|---|---|---|
| 2006/0031765 A1* | 2/2006 | Roderick ................ G06F 3/016 715/702 |
| 2008/0244447 A1* | 10/2008 | Sagar .................... G06F 3/0482 715/810 |
| 2009/0315848 A1 | 12/2009 | Ku et al. |
| 2011/0138277 A1 | 6/2011 | Grant et al. |
| 2012/0046075 A1* | 2/2012 | Griffin .................. G06F 1/1624 455/566 |
| 2012/0192095 A1 | 7/2012 | Bamford et al. |
| 2012/0217147 A1* | 8/2012 | Porter .................. H03K 17/962 200/600 |
| 2012/0254808 A1* | 10/2012 | Gildfind ............. G06F 3/04812 715/863 |
| 2013/0012269 A2 | 1/2013 | Dodge et al. |
| 2013/0063383 A1 | 3/2013 | Anderssonreimer et al. |
| 2013/0145295 A1 | 6/2013 | Bocking et al. |

(Continued)

*Primary Examiner* — Benjamin C Lee  
*Assistant Examiner* — Dong Hui Liang  
(74) *Attorney, Agent, or Firm* — Fish & Richardson P.C.

(57) ABSTRACT

A portable electronic device is provided. The portable electronic device includes a memory configured to store instructions, a plurality of keys configured to receive respective key inputs, and a screen. The portable electronic device also includes a processor configured to execute the instructions to detect a first key input at one of the plurality of keys, enable a preview mode based on the detected first key input. While the preview mode is enabled, the processor is also configured to a second key input at one of the plurality of keys, at least one of the first or second key input being associated with a content preview for one of a plurality of applications, and display on the screen the content preview for the associated one of the plurality of applications.

20 Claims, 9 Drawing Sheets

(56) References Cited

U.S. PATENT DOCUMENTS

2013/0145303 A1*  6/2013  Prakash .............. G06F 3/04883
                                                              715/779
2013/0227413 A1   8/2013  Thorsander et al.
2013/0275923 A1   10/2013 Griffin et al.

* cited by examiner

ELECTRONIC DEVICE AND METHOD FOR PREVIEWING CONTENT ASSOCIATED WITH AN APPLICATION

FIELD OF TECHNOLOGY

The present disclosure relates to electronic devices including, but not limited to, portable electronic devices and their controls.

BACKGROUND

Electronic devices, including portable electronic devices, have gained widespread use. Portable electronic devices include several types of devices such as cellular telephones (mobile phones), smart telephones (smart phones), Personal Digital Assistants (PDAs), tablet computers, or laptop computers, with wireless network communications connectivity, or near-field communications connectivity, such as Bluetooth® capabilities or other electro-magnetic field communication capabilities.

Portable electronic devices are often installed with various applications ("apps") to provide various services and functions. For example, a smart phone may have an email app, a message app, a calendar app, a contact app, etc. Typically, a user has to launch an app in order to view the content associated with the app, such as a new incoming message. This is time consuming and inconvenient.

Improvements in electronic devices that provide more efficient access to content are desired.

BRIEF DESCRIPTION OF THE DRAWINGS

Embodiments of the present disclosure will now be described, by way of example only, with reference to the attached Figures, wherein.

DETAILED DESCRIPTION

Figure 1:
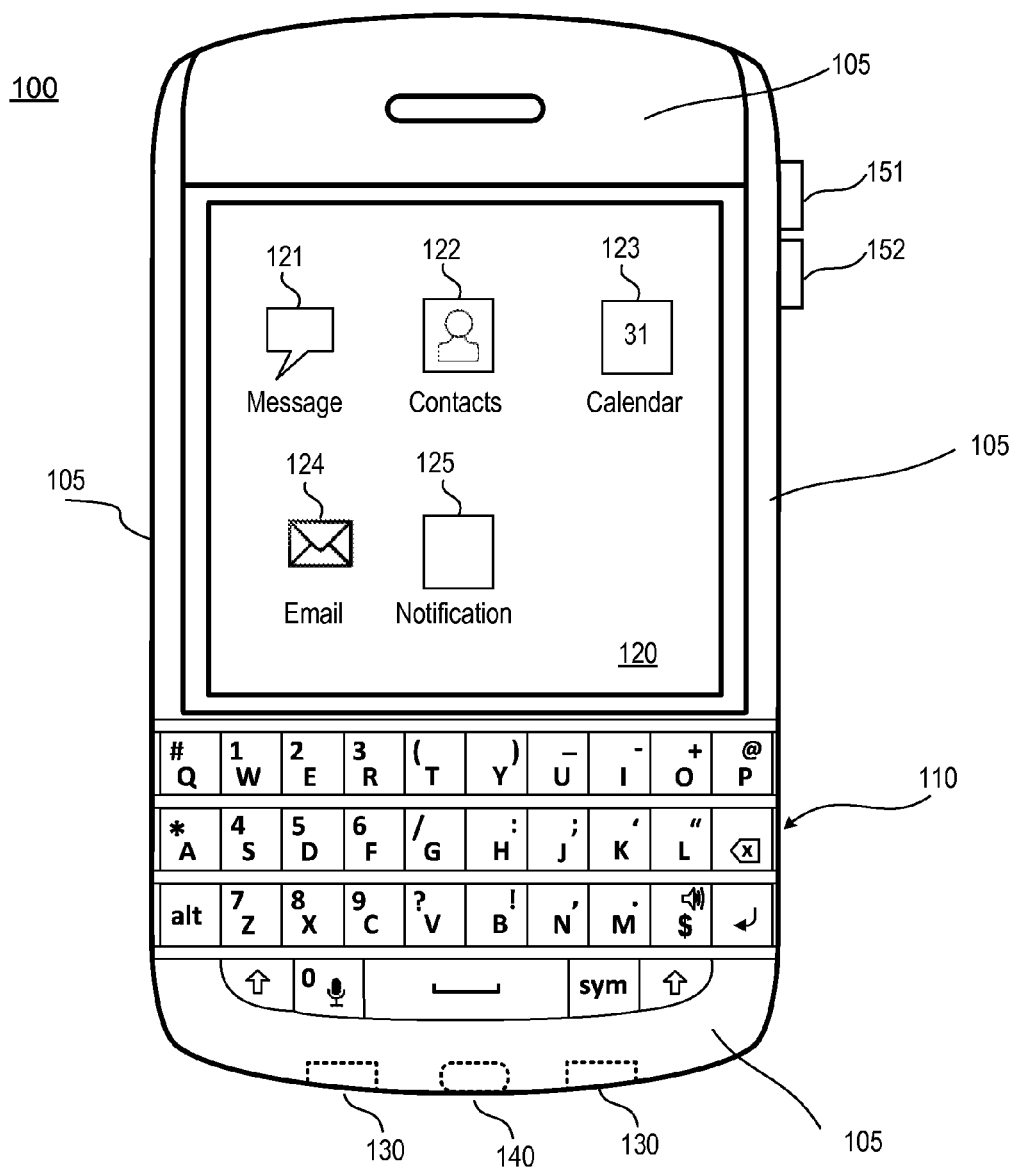
FIG. 1 shows an example of a portable electronic device in accordance with the present disclosure.

Reference will now be made in detail to the disclosed example embodiments, which are illustrated in the accompanying drawings. Wherever possible, the same reference numbers will be used throughout the drawings to refer to the same or like parts.

The present disclosure generally relates to an electronic device, such as a portable electronic device. Examples of portable electronic devices include wireless communication devices such as cellular telephones (mobile phones), smart telephones (smart phones), pagers, PDAs, tablet computers, laptop computers, notebook computers, netbook computers, and so forth, with wireless communications capabilities, such as wireless cellular communications capabilities. The portable electronic device may also be a portable electronic device without wireless communications capabilities. Examples include handheld electronic game devices, digital photograph albums, digital cameras, gaming consoles, GPS devices, portable fitness devices, or similar devices.

A portable electronic device often includes a plurality of keys configured to receive inputs, such as a gesture. The term "gesture" used herein includes a hover operation, a touch operation, a press operation, a hold operation, a swipe operation, or a combination of these operations. The term "key" used herein may include various elements accessible on the portable electronic device, including, for example, keys on a keyboard and one or more volume adjusting keys. The term "key" may also include virtual keys displayed on a screen of the portable electronic device. For example, the keyboard may be a physical keyboard or a virtual keyboard displayed on a screen. Further, the term "key" may include elements not explicitly in a key shape, such as a surface area of a housing of the portable electronic device covering the speaker, a surface area of the housing covering the microphone, or a surface area of the housing covering a light source (such as an LED light source).

A hover operation may include an operation where a key or a screen is not touched or pressed by, for example, a user's finger or a stylus. In a hover operation, the user's finger or stylus may be placed above the key or the screen without any contact. A touch operation may include an operation where a key or a screen is touched with some force. A press operation may include an operation where a key or a screen is pressed with a force greater than the force received in a touch operation. A hold operation may include an operation where a key or a screen is touched or pressed, and that touch or press operation is maintained for a time period, such as, for example, two seconds. A swipe operation may include an operation of continuous sliding from one location of a keyboard or a screen to another location of the keyboard or the screen, while a touch or press of the keyboard or the screen is maintained during the sliding. The swipe operation may follow a touch or press operation of a key or a portion of the screen. Various sensors, e.g., capacitive touch sensors, displacement sensors, or force sensors, may be used to detect a hover operation, a touch operation, a press operation, a hold operation, a swipe operation, or a combination of these operations. Other sensors, such as infrared sensors, laser sensors, light sensors, may also be used. The sensors may be disposed under the keys or the screen, or under the surface areas of the housing of the portable electronic device. The sensors may be configured to detect various gestures discussed above. In some embodiments, a timer may be used to determine an amount of time associated with a hold operation.

In some embodiments, one or more capacitive touch sensors, displacement sensors, or force sensors may be disposed under a keyboard to detect at least one of a hover operation, a touch operation, a press operation, a hold operation, or a swipe operation. It is understood that in some embodiments, a single type of sensor may be used. In other embodiments, two or more types of sensors may be used in combination. Depending on the type of sensors used, various threshold values may be set for distinguishing a touch operation or a hover operation from a press operation. For example, when a force sensor is used associated with the keyboard, a threshold force may be set to distinguish a touch operation of a key and a press operation of a key. An operation with a force less than or equal to the threshold force may constitute a touch operation, and an operation with a force greater than the threshold force may constitute a press operation. Similarly, when a displacement sensor is used, a threshold displacement may be set for distinguishing a touch operation and a press operation of a key. An operation causing a key to deform more than the threshold displacement may constitute a press operation, and an operation causing the key to deform less than or equal to the threshold displacement may constitute a touch operation. Likewise, when a capacitive touch sensor is used, one or more threshold capacitance values may be set for distinguishing a hover operation, a touch operation, and a press operation. In one embodiment, an operation causing a change of capacitance greater than a first threshold capacitance value may constitute a press operation, and an operation causing a change of capacitance less than or equal to the first threshold capacitance value, but greater than a second threshold capacitance value may constitute a touch operation. An operation causing a change of capacitance less than the second threshold capacitance value may constitute a hover operation.

A portable electronic device often includes multiple applications or apps. These apps may be stored in a memory as instructions or code that is executed by a processor to perform various functions provided by the apps. When an app is activated, for example, by selecting an icon associated with the app displayed on the screen of the portable electronic device, all functionality of the app may be enabled. Portable electronic devices consistent with the disclosed embodiments provide a preview mode that, when enabled, displays a preview of content (or "content preview") of an app. The preview mode enables a user to preview content associated with an app without activating all functionality of the app. When the preview mode is enabled and the content is previewed, less than all functionality of the app may be enabled. In other words, the previewed content represents only a portion of content accessible by the associated app when all functionality of the app is activated. For example, a preview of content associated with an email app may display new emails only, rather than all emails (new and old) that may be displayed when the email app is activated. Using the email app as an example, in the preview mode, some functionality may not be enabled, such as, for example, a function allowing a user to select one or more emails for deletion, a function allowing a user to flag an email, or a function allowing a user to view an attachment of an email.

The preview mode may be enabled by the portable electronic device in various ways. In one embodiment, the portable electronic device may enable the preview mode after detecting a first input of a key. The first input may be a first key input at the key. The key may not be associated with a content preview of an app. In one embodiment, the first input may be a press and hold operation of a key for an amount of time, e.g., two seconds. For example, the "P" key may be designated for enabling the preview mode, and the "P" key may not be associated with a content preview of any app. As another example, the portable electronic device may enable the preview mode after detecting that a volume adjusting key has been pressed and held for two seconds when the portable electronic device is in a locked condition. In this example, the volume adjusting key may not be associated with a content preview of any app. A locked condition generally means that the screen of the portable electronic device is locked, and data displayed on the screen in unlocked condition are generally not accessible in the locked condition, unless an input is received to unlock the screen. An input unlocking the screen may be, for example, an input of a password in a dialog box, or a gesture designated for unlocking the screen, such as a swipe operation of the screen.

In another embodiment, the portable electronic device may enable the preview mode after detecting a first input of a key that is associated with a content preview of an app. For example, the "E" key may be associated with a content preview of an email app. The portable electronic device may enable the preview mode for previewing the email app after detecting an input of, for example, pressing the "E" key, or an input of pressing and holding the "E" key for an amount of time (e.g., two seconds). As another example, the volume adjusting key may be associated with a content preview of a volume adjusting app. The portable electronic device may enable the preview mode for previewing the volume adjusting app after detecting an input of, for example, pressing the volume adjusting key, or pressing and holding the volume adjusting key for an amount of time (e.g., two seconds).

While the preview mode is enabled, the portable electronic device may display on the screen a preview of content associated with an app after detecting a second input associated with a key. The second input may be a second key input at the key. In one embodiment, the second input may be a swipe operation originating from a key associated with the content preview of the app. The swipe operation originating from the key may continue onto other keys on the keyboard. The swipe operation may also continue onto the screen. The swipe operation may be in any detectable direction from the key. An amount of content displayed in the preview may vary based on a distance associated with the swipe operation. For example, as the swipe operation continues to move away from the key from which the swipe operation originates, and as the distance from the key increases, the amount of content associated with the app displayed in the preview may increase. In some embodiments, the second input that triggers display of the preview may be a touch operation or a hover operation of a key associated with a content preview of an app. For example, while the preview mode is enabled (e.g., after detecting a press and hold operation of the "P" key for more than two seconds), the portable electronic device may display a preview of the email app after subsequently or simultaneously detecting a touch operation or a hover operation of the "E" key, which may be associated with the content preview of the email app.

FIG. 1 shows an example of a portable electronic device 100 consistent with the present disclosure. The portable electronic device 100 may include a housing 105, a keyboard 110, and a screen 120. The housing 105 may be configured to contain various elements of the portable electronic device 100. The keyboard 110 may include a plurality of keys. The keyboard 110 be include suitable layout, such as QWERTY, QWERTZ, AZERTY, Dvorak, or the like. The keyboard 110 may be a reduced keyboard having two or more characters associated with certain keys, such as a reduced QWERTY keyboard layout. For example, a reduced QWERTY keyboard may be provided in which the letters Q and W share a single key, the letters E and R share a single key, and so forth. The keyboard 110 may be a physical keyboard, and each individual key is a physical key. The keyboard 110 may also be a virtual keyboard displayed on the screen 120, and each individual key is a virtual key.

The screen 120 may be any type of screen. In one embodiment, the screen 120 may include a touch-sensitive display (i.e., the screen 120 may be a touch screen). The screen 120 may display a graphical user interface with various icons (or logos, pictures, etc.) corresponding to various apps. For example, the portable electronic device 100 may include a message app 121, a contacts app 122, a calendar app 123, an email app 124, and a notification app 125. The screen 120 may further display icons representing other apps or functions provided by the portable electronic device 100, such as a map app, a Web browser app, a word processing app, a game app, a volume adjusting app, a date/time app, etc.

The portable electronic device 100 may include other physical keys, such as a first volume adjusting key 151 and a second volume adjusting key 152. The portable electronic device 100 may further include a speaker 130 and a microphone 140. It is understood the portable electronic device 100 may include additional elements not shown in FIG. 1, and may not include all of the exemplary elements shown in FIG. 1.

Keys included in the portable electronic device 100 may be configured to receive an input. For example, keys on the keyboard 110 may be configured to receive a gesture. The gesture may include at least one of a hover operation, a touch operation, a press operation, a hold operation, a swipe operation, or a combination of these operations. In one embodiment, when a key on the keyboard 110 receives a press operation, a corresponding letter, symbol, number, or character may be entered into an app as a text. For example, when the message app 121 is activated and when a new message is being composed, a press operation of the "E" key may cause the letter "e" or "E" to be entered as a text in the new message. When one of the first and second volume adjusting keys 151 and 152 receives a press operation during, for example, a phone call, the portable electronic device 100 may adjust the volume output from the speaker 130 or an internal sound output device (not shown) accordingly.

A plurality of keys from the keyboard 110 may each be associated with a content preview of a specific app, such that while the preview mode is enabled, an operation of the corresponding key may trigger a display of a preview of content associated with the related app. For example, the "E" key on the keyboard 110 may be associated with a content preview of the email app 124, the "M" key may be associated with a content preview of the message app 121, the "C" key may be associated with a content preview of the calendar app 123, and the "K" key may be associated with a content preview of the contact app 122. One or both of the volume adjusting keys 151 and 152 may also be associated with a content preview for a volume adjusting app.

In one embodiment, the portable electronic device 100 may disable the preview mode after more than a threshold period of time has lapsed since the preview mode is enabled. In another embodiment, the portable electronic device 100 may disable the preview mode after detecting a press operation of a key, which may cause the app being previewed to be activated.

Figure 2:
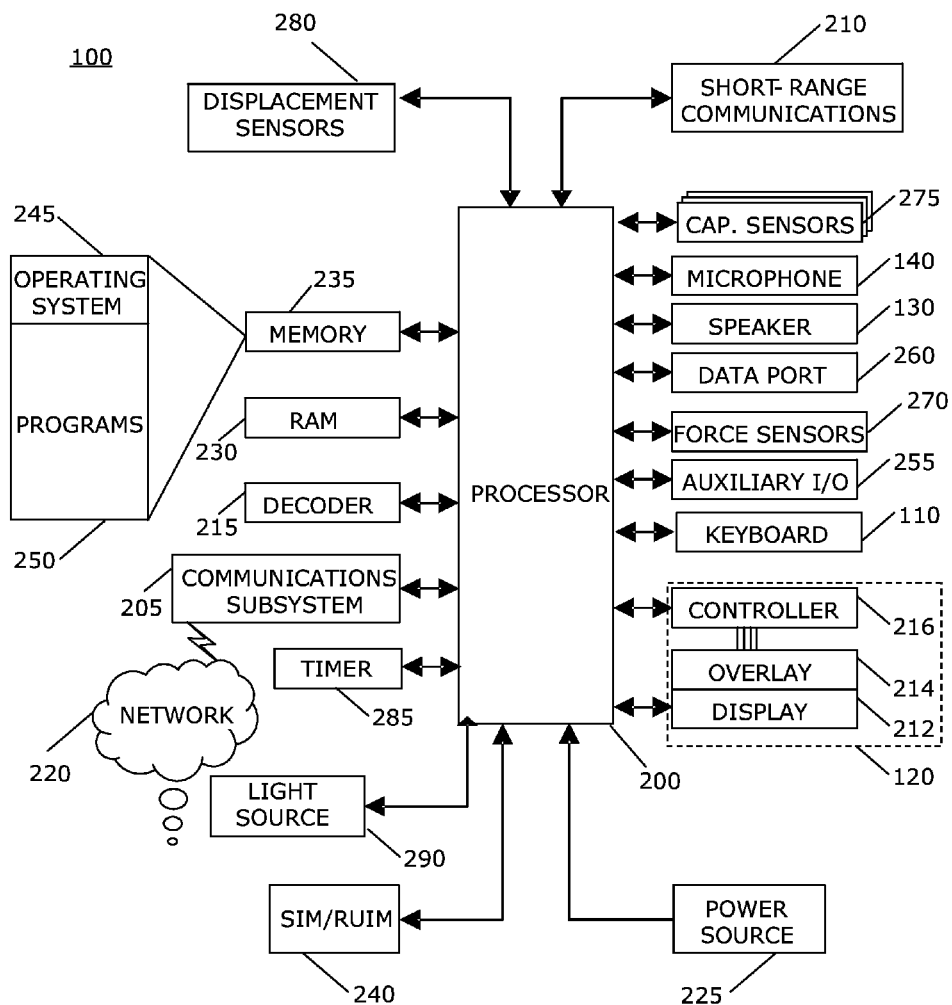
FIG. 2 shows a block diagram of the portable electronic device shown in FIG. 1 in accordance with the present disclosure.

FIG. 2 shows a block diagram of the portable electronic device 100 shown in FIG. 1. The block diagram shows software and hardware elements that may be included in or associated with the portable electronic device 100. It is understood the portable electronic device 100 may include additional elements not shown in FIG. 2, and may not include all of the exemplary elements shown in FIG. 2.

The portable electronic device 100 may include a processor 200, which may control the overall operation of portable electronic device 100. The portable electronic device 100 may include a communications subsystem 205 and a short-range communications module 210 to perform various communication functions, including data and voice communications. Data received by the portable electronic device 100 may be decompressed and decrypted by a decoder 215. The communications subsystem 205 may receive messages from and may send messages to a network 220. The network 220 may be any type of network, including, but not limited to, data wireless networks, voice wireless networks, and networks that support both voice and data communications. The network 220 may be wired or wireless. The portable electronic device 100 may include a power source 225, such as one or more rechargeable batteries or a port to an external power supply, which may supply power to various elements of the portable electronic device 100.

The processor 200 may be coupled to and interact with other hardware or software elements, such as a Random Access Memory (RAM) 230, a memory 235, the screen 120, etc. The RAM 230 and the memory 235 may be any type of memory, for example, a non-transitory flash memory. RAM 230 and memory 235 may store instructions or code that may be executable by the processor 200 to perform various functions, methods, processes, or operations discussed in the present disclosure.

The screen 120 may include a display 212, which may be a touch-sensitive display. The display 212 may be coupled to a touch-sensitive overlay 214 and an electronic controller 216. User-interaction with a graphical user interface (GUI) may be performed through the touch-sensitive overlay 214. The processor 200 may interact with the touch-sensitive overlay 214 via the electronic controller 216. The processor 200 may cause display on the screen 120 of various data, such as text, characters, symbols, images, icons, and other items.

To identify a subscriber for network access, the portable electronic device 100 may use a Subscriber Identity Module or a Removable User Identity Module (SIM/RUIM) card 240 for communication with a network, such as the network 220, which may be wireless. Alternatively or additionally, user identification information may be programmed into memory 235 or RAM 230.

The portable electronic device 100 may include an operating system 245 and software programs or modules 250. The operating system 245 and software programs or modules 250 may contain code or instructions that may be executed by the processor 200 for performing various processes or methods disclosed in the present disclosure. The operating system 245 and software programs or modules 250 may be stored in a non-transitory, persistent, updatable storage device, such as the memory 235. Additional applications or programs may be loaded onto the portable electronic device 100 through the network 220, an auxiliary I/O subsystem 255, a data port 260, or the short-range communications subsystem 210.

A received data or signal, such as a text message, an email message, or web page download, may be processed by the communications subsystem 205 and input to the processor 200. The processor 200 may process the received data or signal for output to at least one of the display 212 or the auxiliary I/O subsystem 255. A subscriber may generate data items, for example email messages, which may be transmitted over the network 220 (which may be wireless) through the communications subsystem 205, for example.

The portable electronic device 100 may include one or more force sensors 270. The force sensors 270 may be configured to detect an input of a gesture on a key or the screen 120. In one embodiment, force sensors 270 may be disposed under the keyboard 110 or the screen 120 to detect the gesture by detecting forces exerted on a key or the screen 120. For example, force sensors 270 may be configured to generate different signals distinguishing a touch operation from a press operation of a key. An operation of a key with a force smaller than or equal to a threshold force may be defined as a touch operation. An operation of a key with a force greater than the threshold force may be defined as a press operation. For example, when the message app 121 is activated, a touch operation of the "E" key may not cause the letter "E" or "e" to be entered in a new message that is being composed, whereas a press operation of the "E" key may cause the letter "E" or "e" to be entered. The processor 200 may determine the type of gestures based on the signals generated by the force sensors 270.

The portable electronic device 100 may include one or more capacitive touch sensors 275 and a light source 290. The capacitive touch sensors 275 may be associated with various elements of the portable electronic device 100, such as, for example, keys on the keyboard 110, the microphone 140, the speaker 130, the data port 226, the light source 290, and the volume adjusting keys 151 and 152. For example, the capacitive touch sensors 275 may be disposed below keys or surface areas provided on the portable electronic device 100. In one embodiment, the portable electronic device 100 may include a plurality of capacitive touch sensors 275 disposed under the keyboard 110, which may be a physical keyboard, and under the screen 120. Each key on the keyboard 110 may be associated with one or more capacitive touch sensors 275. In response to inputs of different gestures on a key or the screen 120, the capacitive touch sensors 275 may generate different signals representing different capacitance changes caused by the gestures. For example, the capacitive touch sensors 275 may generate different signals in response to a hover operation, a touch operation, a press operation, a hold operation, a swipe operation, or a combination of these operations. The processor 200 may determine the type of gestures based on the signals received from the capacitive touch sensors 275.

The portable electronic device 100 may include one or more displacement sensors 280. The displacement sensors 280 may be disposed under, for example, the keyboard 110. In one embodiment, one or more displacement sensors 280 may be disposed under each key of the keyboard 110. A threshold displacement may be set for distinguishing a touch operation and a press operation of a key. An operation causing a key to deform more than the threshold displacement may constitute a press operation, and an operation causing the key to deform less than or equal to the threshold displacement may constitute a touch operation.

The portable electronic device 100 may include a timer 285. The timer 285 may be configured to count an amount of time. For example, the timer 285 may be configured to count or calculate the amount of time elapsed since a press operation of the "E" key. The processor 200 may determine whether the operation of the "E" key is a hold operation based on the amount of time provided by the timer 285. In one embodiment, the processor 200 may determine that a press operation of the "E" key for an amount of time longer than a threshold amount of time (e.g., two seconds) constitutes a hold operation. The timer 285 may be a timer unit internal to the processor 200, or may be a timer unit separated from the processor 200.

Figure 9:
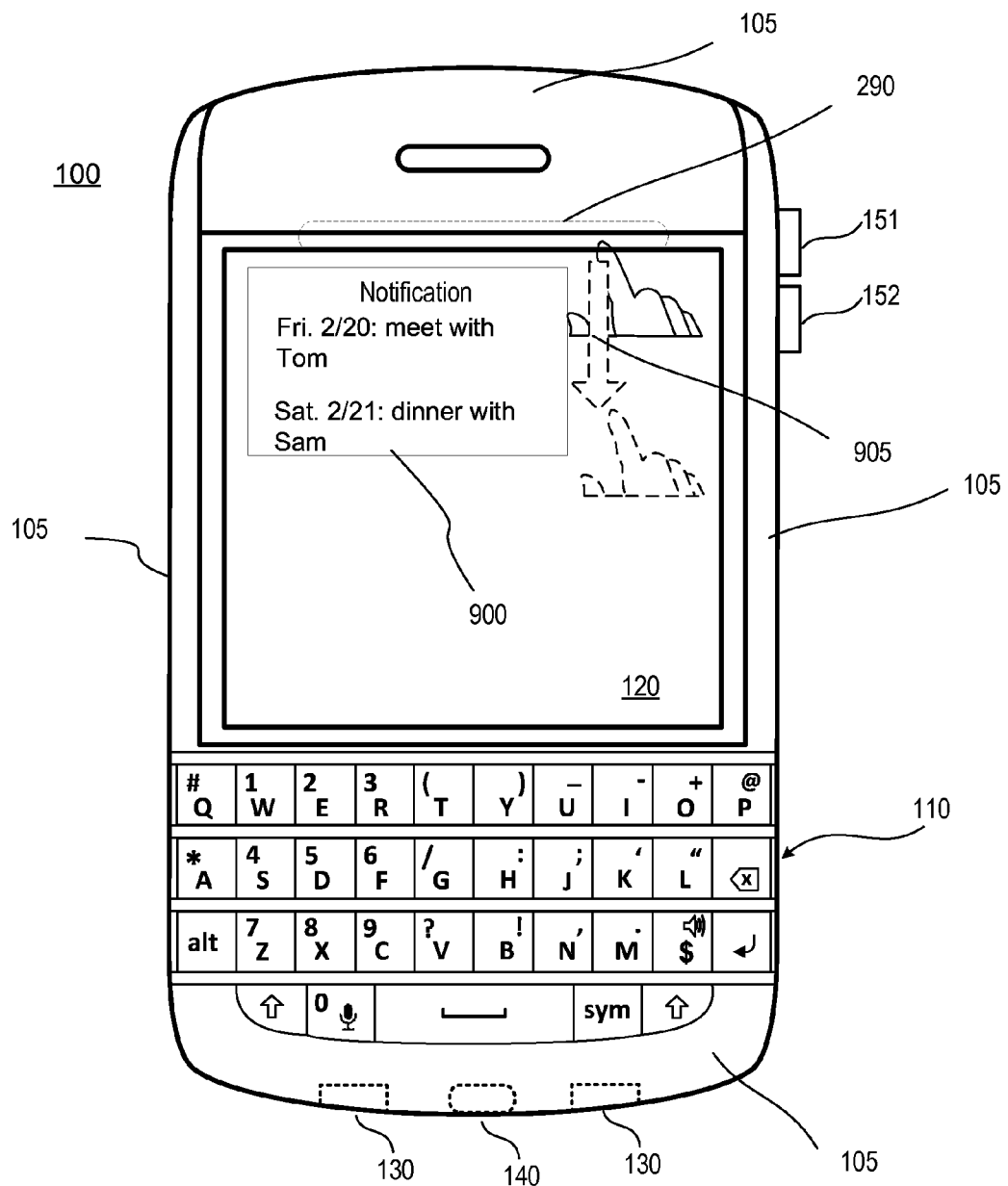
FIG. 9 shows an example of an operation enabling a content preview of a notification application in accordance with the present disclosure.

The light source 290 may be configured to provide light to other elements of the portable electronic device 100. For example, the light source 290 may provide light to illuminate the screen 120. The light source 290 may be disposed behind the screen 120, or may be disposed around the edges of the screen 120, as shown in FIG. 9. The light source 290 may be covered by the housing 105, and may not be directly visible from outside of the portable electronic device 100. In one embodiment, the light source 290 may be disposed at the top edge of the screen 120 and covered by the housing 105. When the preview mode is enabled, the light source 290 may be associated with a content preview of the notification app 125 or other apps.

Figure 3:
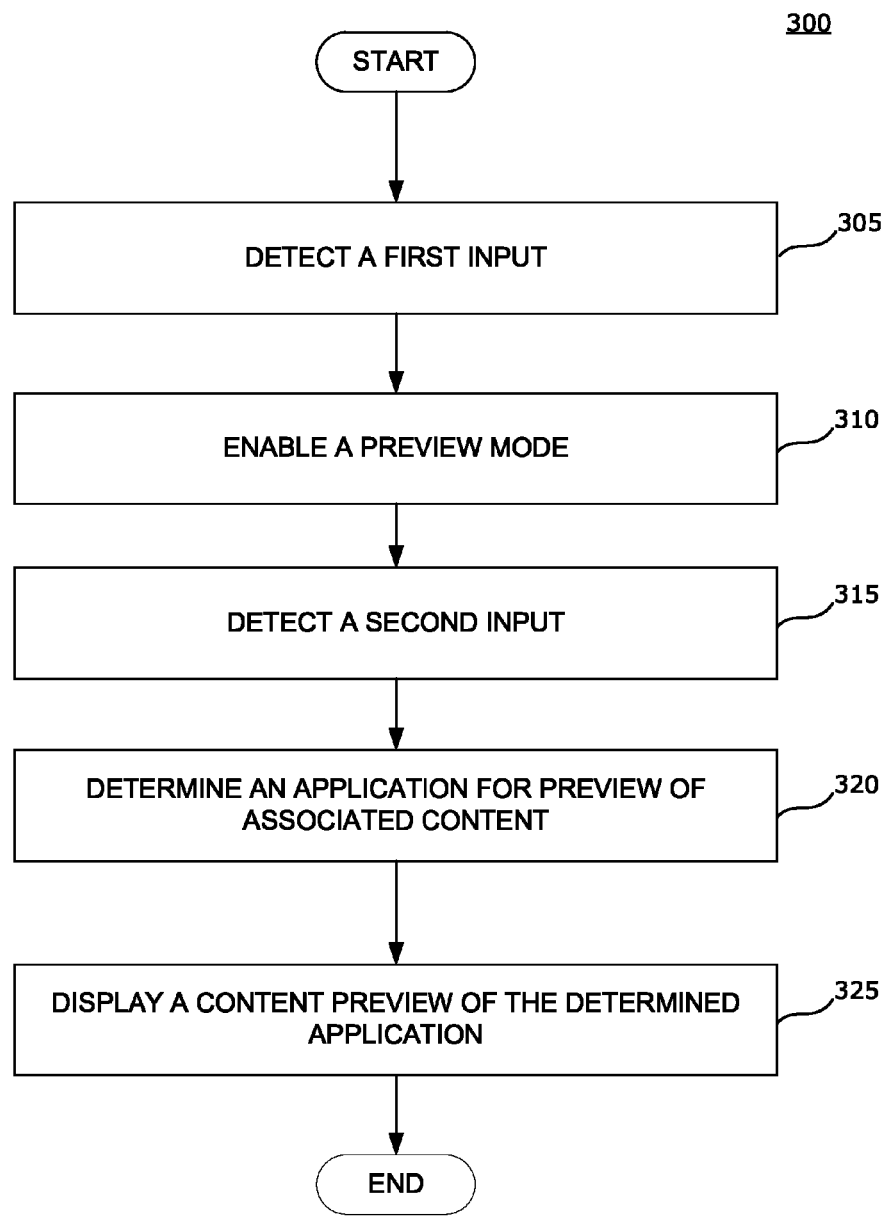
FIG. 3 shows an example of a process for performing a content preview of an application in accordance with the present disclosure.

FIG. 3 shows a flowchart of an exemplary process 300 for performing a content preview of an app associated with the portable electronic device 100. The process 300 may be performed by the processor 200 through executing instructions stored in the memory 235 or the RAM 230. The processor 200 may detect a first input (Step 305). The first input may be associated with one of a plurality of keys configured to receive inputs, such as key inputs. At least some of the keys may be associated with a content preview for one of a plurality of apps. The processor 200 may enable a preview mode based on the detected first input (Step 310). While the preview mode is enabled, the processor 200 may detect a second input associated with one of the plurality of keys (Step 315). The key associated with the first input may be the same as or different from the key associated with the second input. At least one of the first or second input may be associated with a content preview for one of a plurality of apps. The processor 200 may determine an app from the plurality of apps for preview of associated content (Step 320). The determination may be based on at least one of the first input or the second input. The processor 200 may cause display on the screen 120 of a content preview of the determined app (Step 325).

Figure 4A:
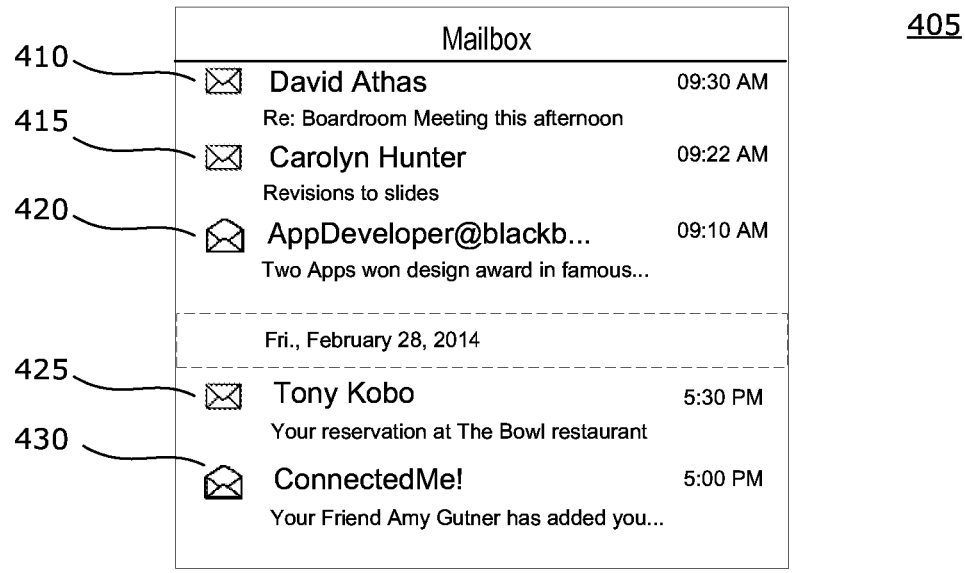
FIG. 4A shows an example of a view of content associated with an email application when the email application is activated in accordance with the present disclosure.
Figure 4B:
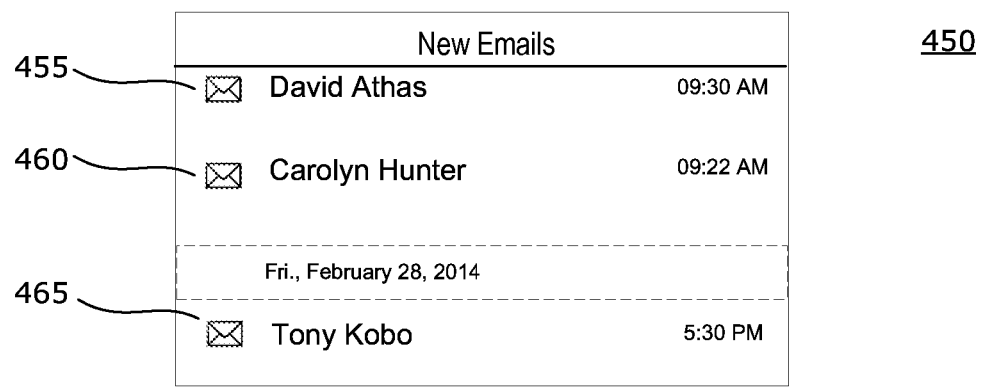
FIG. 4B shows an example of a preview of content associated with the email application when a preview mode is enabled in accordance with the present disclosure.

While the preview mode is enabled and content associated with an app is previewed, less than all functionality of the app is enabled. The previewed content may represent only a portion of content accessible when all functionality of the app is activated. FIGS. 4A and 4B illustrate this difference through one example. FIG. 4A shows an example of a view 405 of content associated with the email app 124 when the email app 124 is activated and when the preview mode is not enabled. When the email app 124 is activated, for example, after detecting an input selecting an icon associated with the email app 124 from the screen 120, the screen 120 may display the view 405 shown in FIG. 4A. The view 405 shown in FIG. 4A displays both new, unread, and old, read emails included in the Mailbox, for example, new, unread emails 410, 415, and 425, and old, read emails 420 and 430. When the email app 124 is enabled and the view 405 is displayed, it is understand that all functionality of the email app 124 may be enabled. For example, a deletion function may be enabled. The deletion function may enable a user to select one or more emails for deletion. A flagging function may also be enabled. The flagging function may enable a user to select one or more emails for flagging as, for example, important or unread. In addition, other functions, such as those enabling the user to view an attachment of an email, may also be enabled.

FIG. 4B shows an example of a content preview 450 of the email app 124 when the preview mode is enabled. In this example content preview 450, only new emails are displayed. Old, read emails otherwise displayed in FIG. 4A when the email app 124 is activated are not displayed in the content preview 450. In addition, content preview 450 shows fewer details of an email than the view 405. For example, as shown in FIG. 4B, the content preview 450 does not show the subject line of an email. When the preview mode is enabled and the content preview 450 is displayed, it is understood that less than all functionality is enabled. Some functions may not be enabled in the preview mode. For example, functions for reply to an email, forwarding an email, viewing an attachment to an email may not be enabled in the preview mode. In other words, with the content preview 450 shown in FIG. 4B, a user may not reply to an email, forward an email, or view an attachment to an email. In addition, the deletion function, flagging function, and any other functions of the email app 124 that are otherwise enabled when the email app 124 is activated, are not enabled in the preview mode.

Figure 5:
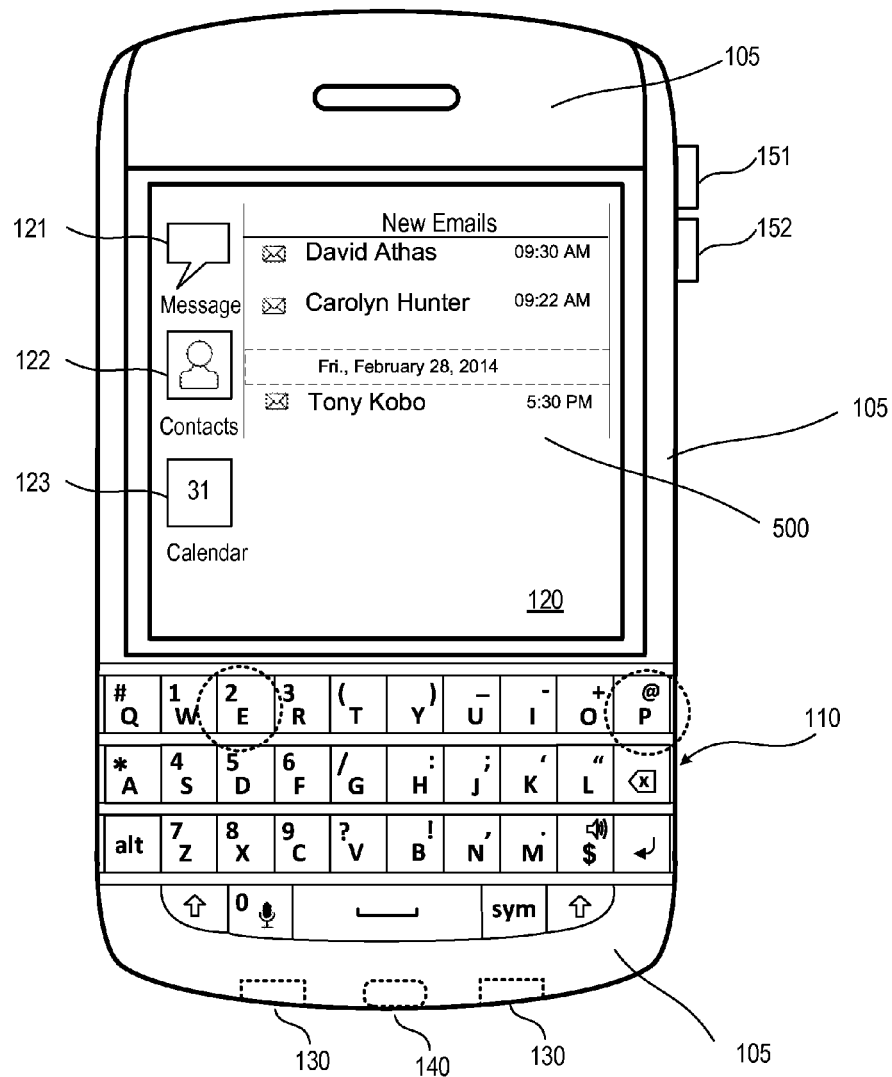
FIG. 5 shows an example of an operation enabling a content preview of the email application in accordance with the present disclosure.
Figure 6:
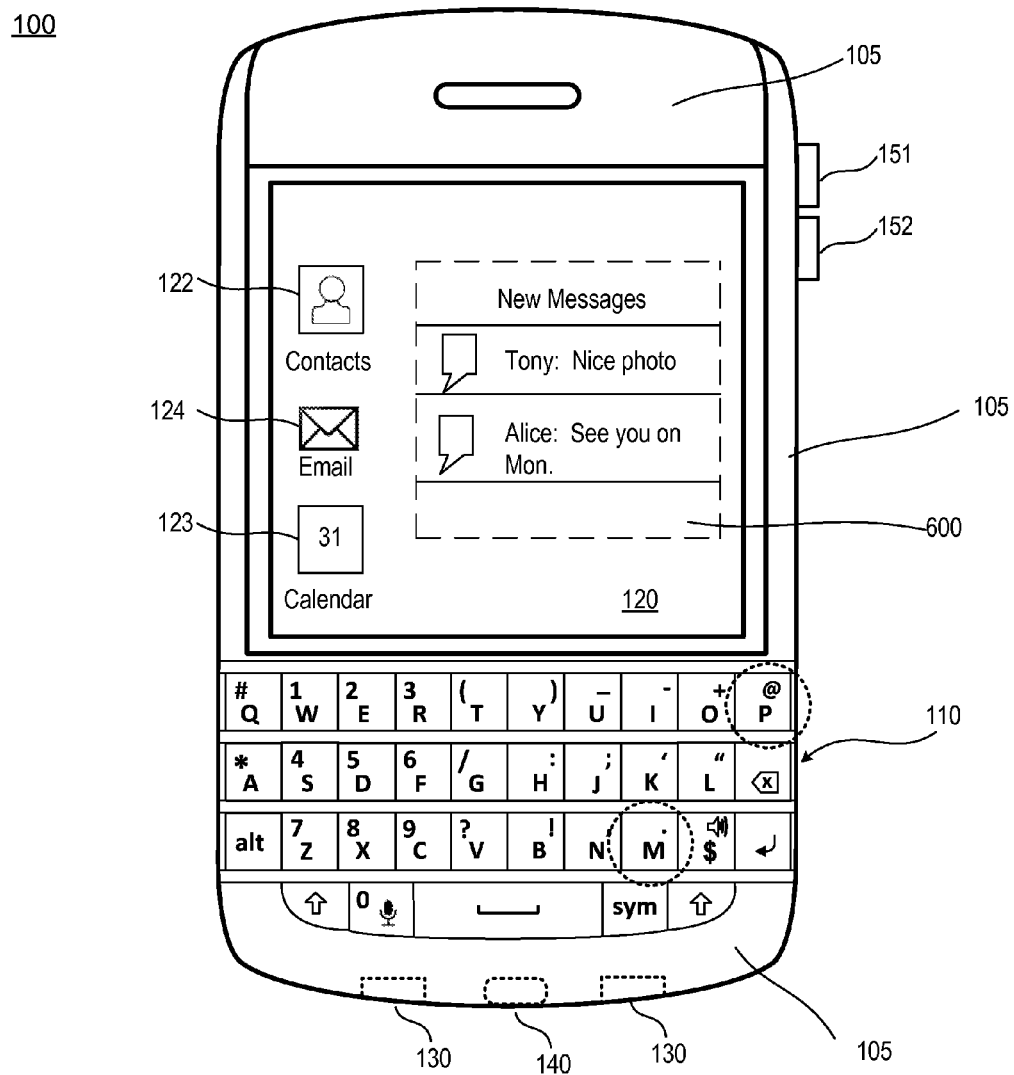
FIG. 6 shows an example of an operation enabling a content preview of a message application in accordance with the present disclosure.

A preview mode may be enabled in various ways. FIGS. 5 and 6 illustrate one example way to enable the preview mode. In the embodiments shown in FIGS. 5 and 6, the processor 200 detects a first input and enables the preview mode based on the first input. The first input may be a press and hold operation of a key (e.g., a key on the keyboard 110). While the preview mode is enabled, the processor 200 detects a second input. The second input may be a touch operation or a hover operation of a key on the keyboard 110. In the embodiments shown in FIGS. 5 and 6, the second input may be associated with a content preview for one of a plurality of apps. The processor 200 determines an app from the plurality of apps based on the second input, for content preview. The processor 200 causes display on the screen 120 of a content preview of the determined app that is associated with the second input.

FIG. 5 shows an example of an operation enabling a content preview of the email app 124. In this example, the processor 200 detects a first input of the "P" key on the keyboard 110, and enables the preview mode based on the first input. When the processor 200 determines that the "P" key has been pressed and held for more than a threshold amount of time (e.g., 2 seconds), the processor 200 enables the preview mode. Although the "P" key is used as an example, it is understood that any other key on the keyboard 110 or outside of the keyboard 110 may be used for enabling the preview mode. In one embodiment, keys for enabling the preview mode may be preset by, for example, the manufacturer of the portable electronic device 100, or the wireless communications carrier. In another embodiment, the portable electronic device 100 may include an app enabling a user to customize which key to use for enabling the preview mode. The press and hold operation is one example gesture that may be used to enable the preview mode. Other gestures, for example, a hover operation, a touch operation, a press operation, a hold operation, a swipe operation, or any combination of these operations, may be used for enabling the preview mode.

While the preview mode is enabled, the processor 200 detects a second input. The second input may include one of a concurrent and a subsequent touch or hover operation of another key. This key may be the same as the key used for enabling the preview mode (e.g., the same "P" key discussed above) or it may be a different key (e.g., the "E" key). The processor 200 determines the app (e.g., the email app 124) from a plurality of apps should be previewed based on the second input (e.g., the touch or hover operation of the "E" key). The processor 200 causes display on the screen 120 of a content preview of the determined app (e.g., the email app 124) associated with the second input. FIG. 5 shows that while the preview mode is enabled, the processor 200 causes display on the screen 120 of a content preview 500 of the email app 124, after detecting one of a concurrent and a subsequent touch or hover operation of the "E" key. The content preview 500 displays only the new emails received in the email app 124. As discussed above in connection with FIGS. 4A and 4B, in the preview mode, only some, but not all, functions of the email app 124 are enabled in the preview mode. While the content preview 500 is displayed, when the processor 200 detects an input (e.g., a touch operation) at a data item (e.g., the new email from "David Athas") displayed in the content preview 500, and may activate the email app 124 in response to the detected input. In another embodiment, when the processor 200 detects the input at the data item, the processor 200 may display additional preview information about the data item (e.g., display content of the new email from "David Athas").

The preview mode may be disabled (or ended) in various ways. In one embodiment, the timer 285 counts an amount of time, for example, since the enabling of the preview mode or since the display of the content preview 500. For example, if the processor 200 does not detect any input of any key associated with a content preview of an app within a time period (e.g., 1 second) since the enabling of the preview mode, the processor 200 may disable (or end) the preview mode. As another example, while a content preview of an app (e.g., the content preview 500) is being displayed on the screen 120, the processor 200 may disable the preview mode after another time period since the display of the preview (e.g., 5 seconds) has lapsed. In yet another example, while the content preview 500 of content associated with the email app 124 is displayed, the processor 200 may detect a third input and may disable the preview mode based on the third input. The third input may be a third key input. In the example shown in FIG. 5, the third input is a press operation of the "E" key. After detecting the press operation of the "E" key while the preview mode is enabled, the processor 200 may disable the preview mode, and may activate the email app 124 associated with "E" key to enable all functionality.

FIG. 6 shows an example of an operation enabling a content preview of the message app 121. Similar to the example shown in FIG. 5, in this example, the processor 200 detects a first input, such as a press and hold operation of the "P" key, and enables the preview mode based on the first input. While the preview mode is enabled, the processor 200 detects a second input, which may be, for example, one of a concurrent and a subsequent hover or touch operation of the "M" key. The processor 200 determines that the "M" key is associated with a content preview of the message app 121, and determines that the content associated with the message app 121 should be previewed. The processor 200 causes display on the screen 120 of a content preview 600 of the message app 121. In the example shown in FIG. 6, the content preview 600 displays only new messages received in the message app 121, but not old messages. In the preview mode, less than all functionality of the message app 121 is enabled. For example, in the preview mode, a reply function, a forward function, a function enabling a user to review an attachment to a message, etc., may not be enabled, which would otherwise be enabled when the message app 121 is activated and the preview mode is disabled. In other words, in the preview mode, a user may not use functions such as replying to a message, forwarding a message, or viewing attachments to a message.

Figure 7:
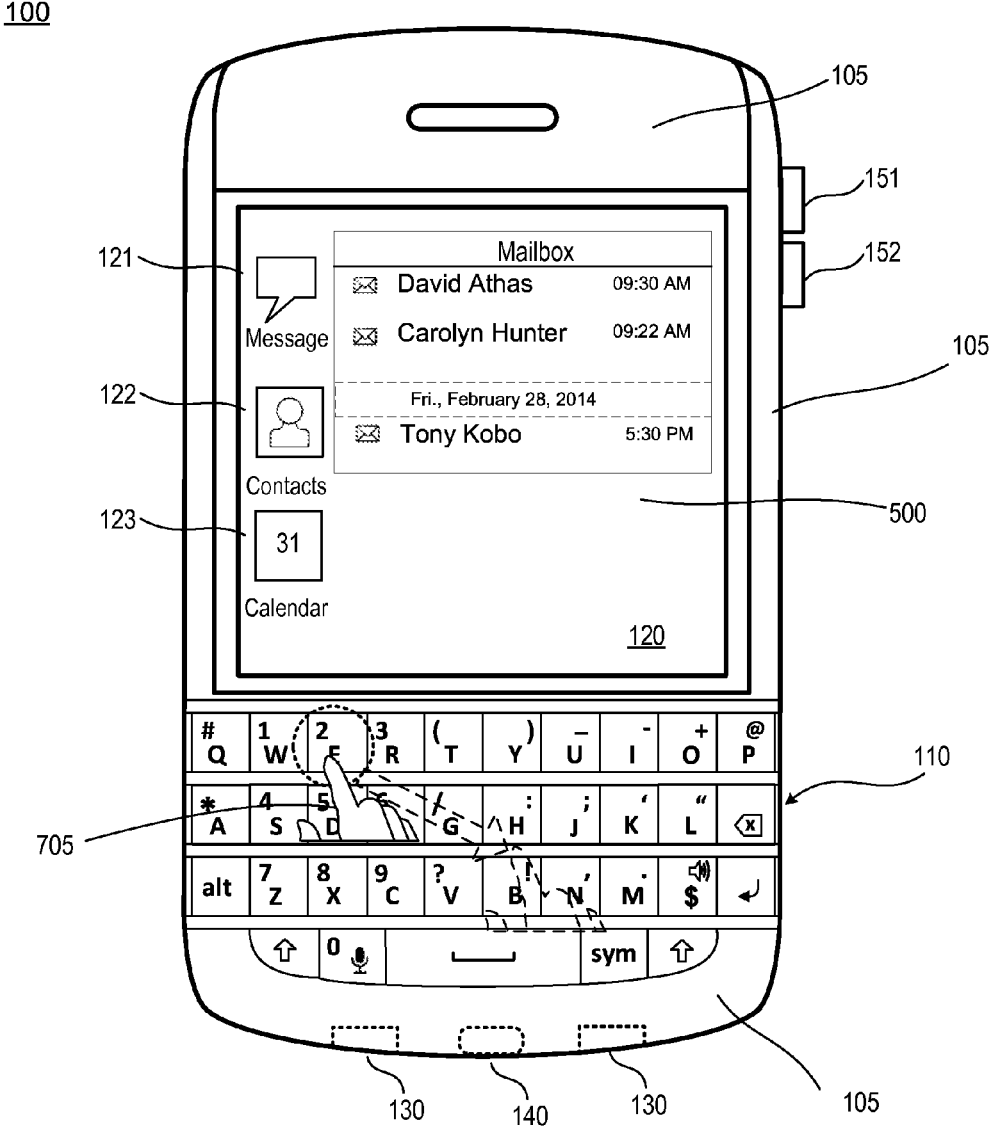
FIG. 7 shows an example of another operation enabling a content preview of content associated with the email application in accordance with the present disclosure.

FIG. 7 shows an example of an operation enabling a content preview of the email app 124. Although the email app 124 is used in the example for illustrative purposes, it is understood that the operation illustrated in FIG. 7 and discussed below may be applicable to any other app. The processor 200 detects a first input associated with a key. The first input is a gesture, such as, for example, a press operation or a hold operation of a key associated with content preview of an app. It is understood that the hold operation may be a touch and hold operation or a press and hold operation. In the example shown in FIG. 7, the processor 200 detects a press operation or a hold operation the "E" key, and enables the preview mode based on the detected press operation or the hold operation of the "E" key. While the preview mode is enabled, the processor 200 determines an app (i.e., the email app 124) from a plurality of apps for content preview, based on the first input (i.e., the press operation or the hold operation of the "E" key). As discussed above, the "E" key may be associated with a content preview of the email app 124 when the preview mode is enabled.

While the preview mode is enabled, the processor 200 detects a second input. The second input may be associated with the same "E" key. In one embodiment, the second input is a swipe operation originating at the first input, e.g., from the "E" key, as illustrated by a movement 705 in FIG. 7. The swipe operation may follow the first input (e.g., the press operation or the hold operation of the "E" key). The swipe operation may be in any detectable direction. The swipe operation may be performed on the keyboard 110 or may continue onto a location outside of the keyboard, e.g., the screen 120, which may be a touch screen. The swipe operation may require a touch operation or a hover operation of the keyboard 110 or the screen 120 to be maintained while the swipe operation moves across the keyboard 110 or the screen 120. For example, while the swipe operation continues to move away from the "E" key, a touch operation of the other keys on the course of the swipe operation may be required to be maintained. If the swipe operation continues onto the screen 120, a touch operation of the screen 120 on the course of the swipe operation may be required to be maintained. In one embodiment, if the processor 200 detects that a touch operation of the keyboard 110 or the screen 120 on the course of the swipe operation has been ended, the processor 200 may terminate the swipe operation.

After detecting the swipe operation originating from the "E" key, the processor 200 causes display on the screen 120 of the content preview 500 of the email app 124. An amount of content displayed in the content preview 500 may vary based on a swipe distance associated with the swipe operation. In one embodiment, the amount of content displayed in the content preview 500 may vary based on a linear distance between the originating key (e.g., the "E" key) and the current location of the swipe operation. For example, as the swipe operation continues, the amount of content displayed in the content preview 500 may increase as the linear distance from the "E" key increases, and may decrease as the linear distance from the "E" key decreases. In other words, the amount of content may increase as the swipe operation moves away from the "E" key, and may decrease as the swipe operation moves toward the "E" key. In another embodiment, the amount of content displayed in the content preview 500 may vary based on a distance in a direction of movement of the swipe operation. For example, the swipe operation may follow a substantially circular course (e.g., a circle around the "E" key). As the swipe operation continues clockwise on the circular course, the amount of content displayed in the content preview 500 may continue to increase. If the swipe operation switches the direction and moves counter-clockwise on the circular course, the amount of content displayed in the content preview 500 may decrease. The amount of content displayed in the content preview 500 may change dynamically or continuously as the distance associated with the swipe operations changes dynamically or continuously.

Figure 8:
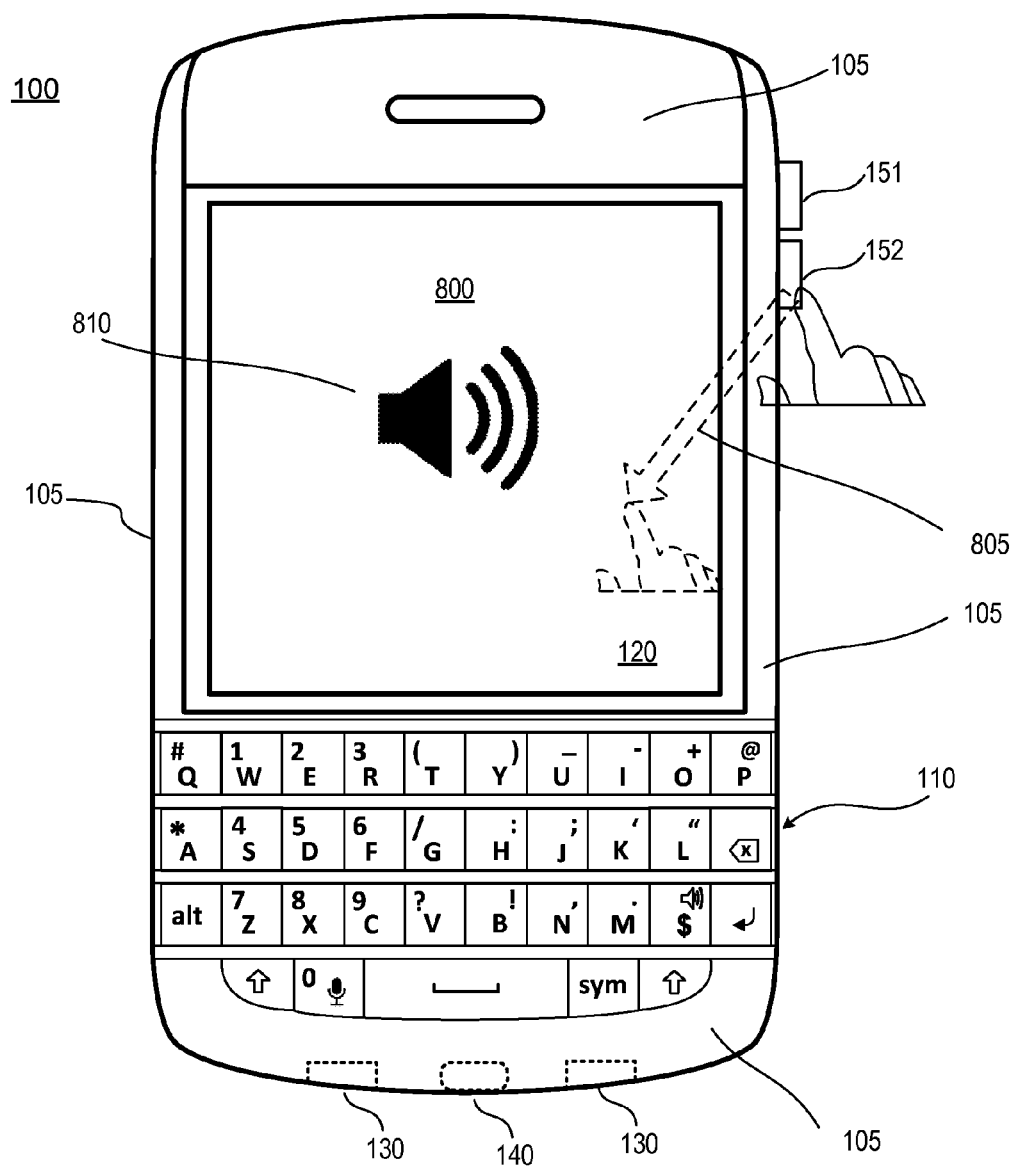
FIG. 8 shows an example of an operation enabling a content preview of a volume adjusting application in accordance with the present disclosure.

FIG. 8 shows an example of an operation enabling a content preview of a volume adjusting app. In this example, the processor 200 detects a first input of a key outside of the keyboard 110, for example, one of the first and second volume adjusting keys 151 and 152. The first input is a gesture including at least one of a hover operation, a touch operation, a press operation, a hold operation, a swipe operation, or a combination of these operations. For example, the processor 200 may detect a press operation of one of the first volume adjusting key 151 or the second volume adjusting key 152 when the portable electronic device is in a locked condition. The processor 200 enables a preview mode based on the first input. While the preview mode is enabled, the processor 200 determines an app (e.g., the volume adjusting app) associated with the first volume adjusting key 151 or the second volume adjusting key 152, and determines that the content associated with the volume adjusting app should be previewed.

The processor 200 detects a second input associated with the first volume adjusting key 151 or the second volume adjusting key 152. The second input may be a swipe operation originating from the first volume adjusting key 151 or the second volume adjusting key 152. FIG. 8 shows an example swipe operation originating from the second volume adjusting key 152, as illustrated by a movement 805. The swipe operation may continue onto a portion of the screen 120. As the swipe operation continues on the screen 120, the screen 120 may or may not display a virtual keyboard. After detecting the swipe operation, the processor 200 causes display on the screen 120 of a content preview 800 of content associated with the volume adjusting app. The content preview 800 may display a volume adjusting icon 810 showing the current status of the volume. It is understood that when the content preview 800 is displayed, not all functionality of the volume adjusting app may have been enabled. Some functions, such as, for example, those for adjusting sound features (bass, high, surround, etc.), may not be enabled in the preview mode. While the preview mode is enabled, the content preview 800 may enable a user to use the icon 810 to adjust the volume, for example, by tapping on a screen portion left to the icon 810 to reduce the volume or tapping on a screen portion right to the icon 810 to increase the volume.

FIG. 9 shows an example of an operation enabling a content preview of the notification app 125. The portable electronic device 100 may include the light source 290 installed near a top portion of the screen 120. The light source 290 may be disposed below the screen 120, or near the top edge of the screen 120. The light source 290 may be disposed below a surface area of the housing 105. The light source 290 may be associated with one or more sensors (e.g., a light sensor, a capacitive touch sensor 275, etc.) configured to detect an input associated with the light source 290. For example, a light sensor or a capacitive touch sensor may be disposed at a suitable location within the portable electronic device 100, such as, for example, a location below the surface area of the housing 105 near the top edge of the screen 120, or a location below the top portion of the screen 120. The one or more sensors may generate signals, based on which the processor 200 detects a first input associated with the light source 290. The first input may be, for example, a touch or press operation (e.g., by a user's finger) of the top edge of the screen 120. The first input may also be, for example, a touch or press operation of the surface area of the housing 105 near the top edge of the screen 120. The first input may further be, for example, a touch or press operation of both the top edge of the screen 120 and the surface area of the housing 105 near the top edge of the screen 120.

The processor 200 enables the preview mode based on the first input, and determines an app from a plurality of apps for preview based on the first input. For example, the processor 200 may determine that the notification app 125 should be previewed because the light source 290 is associated with a content preview of the notification app 125 when the preview mode is enabled. While the preview mode is enabled, the processor 200 detects a second input, which may be a swipe operation originating from the location where the first input is received. The swipe operation is illustrated by a movement 905 in FIG. 9. For example, the processor 200 detects a swipe operation following a touching operation of at least one of the top edge of the screen 120 or the surface area of the housing 105 near the top edge of the screen 120. The processor 200 may cause display on the screen 120 of a content preview 900 of the notification app 125 after detecting the swipe operation. As the swipe operation moves further down on the screen 120, the amount of content shown in the content preview 900 may increase. As the swipe operation moves up toward the top edge of the screen 120, the amount of content displayed in the content preview 900 may decrease. In other words, the amount of content displayed in the content preview 900 may vary based on a swipe distance associated with the swipe operation.

It is understood that when the preview mode is enabled, less than full functionality of the notification app 125 may be enabled. For example, functions that enable a user to forward a notification data item to a person by email, which may otherwise be enabled when the notification app 125 is activated, may not be enabled in the preview mode. In some embodiments, after detecting a touch operation of a data item displayed in the content preview 900, the processor 200 may disable the preview mode and may activate the notification app 125 to enable full functionality of the notification app 125. In some embodiments, after detecting that the swipe operation has been ended (e.g., if the processor 200 detects that a user's finger has been released from the screen 120), the processor 200 may disable the preview mode. Other methods, such as those based on an amount of elapsed time, may also be used for disabling the preview mode. For example, if the processor 200 does not detect a swipe operation on the screen 120 after an amount of time has elapsed since detecting the touch or press operation of at least one of the top edge of the screen 120 and the surface area of the housing 105 near the top edge of the screen 120, the processor 200 may disable the preview mode.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of transitory or non-transitory computer readable media, such as secondary storage devices, for example, hard disks, floppy disks, or CD ROM, or other forms of RAM or ROM, USB media, DVD, or other optical drive media.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A portable electronic device, comprising:
a memory configured to store instructions and a plurality of applications;
a plurality of keys of an alphanumeric keyboard configured to receive respective key inputs;
a screen; and
a processor configured to execute the instructions to:
detect a first key input at one of the plurality of keys;
in response to detecting the first key input, enable a preview mode, wherein the preview mode is enabled independent of displaying any content preview on the screen, and when the preview mode is enabled, some of the plurality of keys are associated with triggering a display of content preview;
while the preview mode is enabled, detect a second key input at one of the plurality of keys, the second key input being associated with a content preview for a respective one of the plurality of applications; and
in response to the detecting the second key input while the preview mode is enabled based on the detected first key input, display on the screen the content preview for the associated one of the plurality of applications.

2. The portable electronic device of claim 1, wherein the previewed content represents only a portion of content accessible by the associated one of the plurality of applications.

3. The portable electronic device of claim 1, wherein at least one of the first key input and the second key input comprises a gesture.

4. The portable electronic device of claim 3, wherein the gesture comprises at least one of a press operation, a hold operation, a touch operation, a hover operation, and a swipe operation.

5. The portable electronic device of claim 1,
wherein the first key input comprises at least one of a press and a hold operation, and
wherein the second key input comprises a swipe operation originating at the first key input.

6. The portable electronic device of claim 5, wherein an amount of content displayed in the content preview varies based on a swipe distance of the swipe operation.

7. The portable electronic device of claim 6,
wherein the screen is a touch screen, and
wherein the swipe operation extends from one of the plurality of keys onto the touch screen.

8. The portable electronic device of claim 1,
wherein the first key input comprises a press and hold operation of a first key of the plurality of keys, and
wherein the second key input comprises one of a concurrent and a subsequent touch or hover operation of a second key of the plurality of keys.

9. The portable electronic device of claim 1, wherein the plurality of keys are physical keys comprising one or more capacitive touch sensors.

10. The portable electronic device of claim 9,
wherein the second key input comprises a touch or hover operation of a physical key, and wherein the processor is further configured to execute the instructions to:
    while the preview mode is enabled,
        detect a press operation of the physical key;
        end the preview mode; and
        activate the associated one of the plurality of applications.

11. The portable electronic device of claim 1, wherein the processor is further configured to execute the instructions to:
    while the preview mode is enabled,
        determine that more than a threshold period of time has lapsed; and
        end the preview mode.

12. The portable electronic device of claim 1, wherein the processor is further configured to execute the instructions to:
    while the preview mode is enabled,
        detect an input at a data item displayed on the screen in the content preview; and
        activate the associated one of the plurality of applications in response to the detected input.

13. The portable electronic device of claim 1, wherein the processor is further configured to execute the instructions to:
    while the preview mode is enabled,
        detect an input at a data item displayed on the screen in the preview; and
        display additional preview information about the data item.

14. A computer-implemented method comprising the following operations executed by a processor:
    detecting a first key input at one of a plurality of keys of an alphanumeric keyboard, the plurality of keys configured to receive respective key inputs;
    in response to detecting the first key input, enabling a preview mode, wherein the preview mode is enabled independent of displaying any content preview on a screen, and when the preview mode is enabled, some of the plurality of keys are associated with triggering a display of content preview;
    while the preview mode is enabled, detecting a second key input at one of the plurality of keys, the second key input being associated with a content preview for a respective one of a plurality of applications executed on a device that includes the processor; and
    in response to the detecting the second key input while the preview mode is enabled based on the detected first key input, displaying on the screen the content preview for the associated one of the plurality of applications.

15. A nontransitory computer readable medium encoded with instructions that, when executed by a processor, cause the processor to perform a method comprising:
    detecting a first key input at one of a plurality of keys of an alphanumeric keyboard, the plurality of keys configured to receive respective key inputs;
    in response to detecting the first key input, enabling a preview mode, wherein the preview mode is enabled independent of displaying any content preview on a screen, and when the preview mode is enabled, some of the plurality of keys are associated with triggering a display of content preview;
    while the preview mode is enabled, detecting a second key input at one of the plurality of keys, the second key input being associated with a content preview for a respective one of a plurality of applications executed on a device that includes the processor; and
    in response to the detecting the second key input while the preview mode is enabled based on the detected first key input, displaying on the screen the content preview for the associated one of the plurality of applications.

16. The nontransitory computer readable medium of claim 15, wherein at least one of the first key input and the second key input comprises a gesture.

17. The nontransitory computer readable medium of claim 15,
    wherein the first key input comprises a press and hold operation of a first key of the plurality of keys, and
    wherein the second key input comprises a one of a concurrent and a subsequent touch or hover operation of a second key of the plurality of keys.

18. The nontransitory computer readable medium of claim 15,
    wherein the plurality of keys are physical keys comprising one or more capacitive touch sensors.

19. The nontransitory computer readable medium of claim 18,
    wherein the second key input comprises a touch or hover operation of a physical key, and
    wherein the processor is further configured to execute the instructions to:
        while the preview mode is enabled,
            detect a press operation of the physical key;
            end the preview mode; and
            activate the associated one of the plurality of applications.

20. The nontransitory computer readable medium of claim 15, wherein the processor is further configured to execute the instructions to:
    while the preview mode is enabled,
        detect an input at a data item displayed on the screen in the content preview; and
        activate the associated one of the plurality of applications in response to the detected input.

* * * * *